United States Patent
Park (10) Patent No.: US 10,493,989 B2
(45) Date of Patent: Dec. 3, 2019

(54) VEHICLE AND METHOD OF PROVIDING INFORMATION FOR THE SAME

(71) Applicants: HYUNDAI MOTOR COMPANY, Seoul (KR); KIA MOTORS CORPORATION, Seoul (KR)

(72) Inventor: Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 188 days.

(21) Appl. No.: 15/835,330

(22) Filed: Dec. 7, 2017

(65) Prior Publication Data

US 2019/0001983 A1   Jan. 3, 2019

(30) Foreign Application Priority Data

Jun. 30, 2017   (KR) .................. 10-2017-0083489

(51) Int. Cl.
*B60W 30/18*   (2012.01)
*B60W 40/09*   (2012.01)
(Continued)

(52) U.S. Cl.
CPC ......... *B60W 30/18072* (2013.01); *B60L 7/10* (2013.01); *B60L 15/2009* (2013.01);
(Continued)

(58) Field of Classification Search
CPC .......... B60T 7/12; B60T 8/1705; B60T 8/172; B60T 8/3235; B60T 8/58; B60T 7/18; B60T 7/22; B60T 13/665; B60T 17/228; B60K 6/48; B60K 1/02; B60K 6/543; B60W 30/18072; B60W 10/08; B60W 10/101; B60W 10/11; B60W 20/30; B60W 40/09; B60W 2510/083; B60W 2520/105; B60W 2540/10; B60W 2540/30; B61L 23/14; B61L 3/008; B61L 25/021; B61L 25/025; B61L 25/026; B61H 13/00; B60L 7/18; B60L 15/40; B60L 7/26; B60L 15/2009; B60L 50/16; B60L 7/10; B60L 2250/18;
(Continued)

(56) References Cited

U.S. PATENT DOCUMENTS 4,319,665 A * 3/1982 Komuro .................. B66B 1/308
                                                   187/296
2007/0173372 A1* 7/2007 Ueno ....................... B60K 6/48
                                                   477/3

(Continued)

*Primary Examiner* — Behrang Badii
(74) *Attorney, Agent, or Firm* — Morgan, Lewis & Bockius LLP (57) ABSTRACT

A method of guiding a coasting time point of a vehicle includes steps of detecting occurrence of an upcoming deceleration event, determining driver's coasting characteristics for each deceleration event based on information of the detected occurrence of an upcoming deceleration event and a vehicle driving state, and determining a coasting guidance time point based on a determined result of coasting characteristics corresponding to a type of the detected deceleration event. The method provides, to a driver, information of a time point at which the driver needs to release an accelerator pedal operation, in order to begin coasting at an appropriate time point when a deceleration situation is assumed to lie ahead.

19 Claims, 7 Drawing Sheets

(51) Int. Cl.
*B60L 7/10* (2006.01)
*B60L 15/20* (2006.01)
*B60W 10/08* (2006.01)
*B60K 6/48* (2007.10)
*B60K 1/02* (2006.01)

(52) U.S. Cl.
CPC ............... *B60W 40/09* (2013.01); *B60K 1/02* (2013.01); *B60K 6/48* (2013.01); *B60L 2250/18* (2013.01); *B60L 2260/24* (2013.01); *B60L 2260/26* (2013.01); *B60L 2260/44* (2013.01); *B60W 10/08* (2013.01); *B60W 2510/083* (2013.01); *B60W 2520/105* (2013.01); *B60W 2540/10* (2013.01); *B60W 2540/30* (2013.01); *B60Y 2200/91* (2013.01); *B60Y 2200/92* (2013.01); *Y10S 903/00* (2013.01)

(58) Field of Classification Search
CPC ............. B60L 2260/24; B60L 2260/26; B60L 2260/44; B60Y 2200/91; B60Y 2200/92; Y10S 903/00
See application file for complete search history.

(56) References Cited

U.S. PATENT DOCUMENTS

2008/0254937 A1* 10/2008 Makiyama .......... F16H 61/0213
  477/47
2017/0305396 A1* 10/2017 Shiratsuchi ............... B60T 7/12

* cited by examiner

--RELATED ART--

VEHICLE AND METHOD OF PROVIDING INFORMATION FOR THE SAME

This application is based on and claims the benefit of priority to Korean Patent Application No. 10-2017-0083489, filed on Jun. 30, 2017 in the Korean Intellectual Property Office, which is hereby incorporated by reference as if fully set forth herein.

TECHNICAL FIELD

The present disclosure relates to a vehicle and a method of providing information for the same, and more particularly to a method of indicating to a driver the time point at which the driver needs to release an accelerator pedal operation, in order to begin coasting at an appropriate time point when a deceleration situation is assumed to lie ahead, and a vehicle in which the same is implemented.

BACKGROUND

Recently, with increasing demand for improving fuel efficiency of vehicles and with stringent regulations on emissions from vehicles made in many countries, the demand for environmentally friendly vehicles has increased. In order to meet this demand and regulations, the environmentally friendly vehicles, for example, hybrid vehicles and electric vehicles have been developed.

However, these vehicles need to have a power train and a control system that are different from those of a general internal combustion engine vehicle. Therefore, there is the demand for methods of increasing fuel efficiency and reducing exhaust gas, which may also be applied to general vehicles.

As one of these methods, when a deceleration situation is expected ahead, it may be desirable to induce a vehicle to perform driving using inertia (or "coasting") by prompting a driver to release his/her foot from an accelerator pedal at an appropriate time point, which may prevent unnecessary fuel consumption. In particular, in the case of a hybrid vehicle having an electric driving motor, a reduction in fuel consumption may be anticipated when an accelerator pedal is not operated and a greater increase in fuel efficiency may be anticipated when a hydraulic brake is not used, but only the regenerative braking force of the electric motor is used, when deceleration is required.

In particular, deceleration via such coasting may be more useful when an upcoming deceleration situation (e.g. speed cameras, tollgates, and curved roads) can be more accurately predicted thanks to recently introduced high-precision maps and vehicle sensors. This will be described below with reference to FIG. 1.

Figure 1:
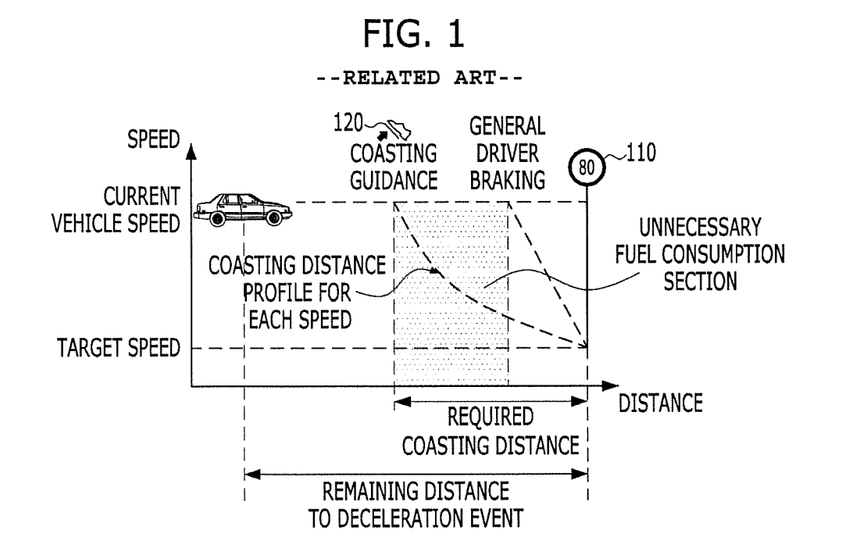
FIG. 1 is a view for explaining the concept of general coasting guidance.

FIG. 1 is a view for explaining the concept of general coasting guidance.

Referring to FIG. 1, when a vehicle acquires information regarding an upcoming deceleration event via high-precision maps and vehicle sensors, the remaining distance to the upcoming deceleration event and a target speed of the vehicle may be calculated. When matching the calculated information with coasting distance profiles for each vehicle and for each speed acquired via tests and the like, the distance required for coasting to reach the target speed at the current vehicle speed may be calculated. Thus, when the vehicle gives a driver a notice in a predetermined form at the time point at which the remaining distance to the upcoming deceleration event reaches the required coasting distance, the driver may begin coasting by releasing his/her foot from an accelerator pedal.

Thus, unnecessary fuel consumption is reduced by the amount of time between the time point at which the driver first releases his/her foot from the accelerator pedal and the time point at which the driver performs braking via a brake after visually recognizing the upcoming deceleration event. Of course, no notice may be output when the driver releases his/her foot from the accelerator pedal before the time point at which the notice is to be transmitted.

However, when deceleration using the regenerative braking force of an electric motor is used in such coasting, a torque corresponding to the regenerative braking force acting on coasting, i.e. a coasting torque may generally provide less deceleration, thus entailing the risk of interfering with traffic flow.

Therefore, when applying a function of indicating to the driver information about the coasting time point, a torque different from a general coasting torque may be applied. This will be described below with reference to FIG. 2.

Figure 2:
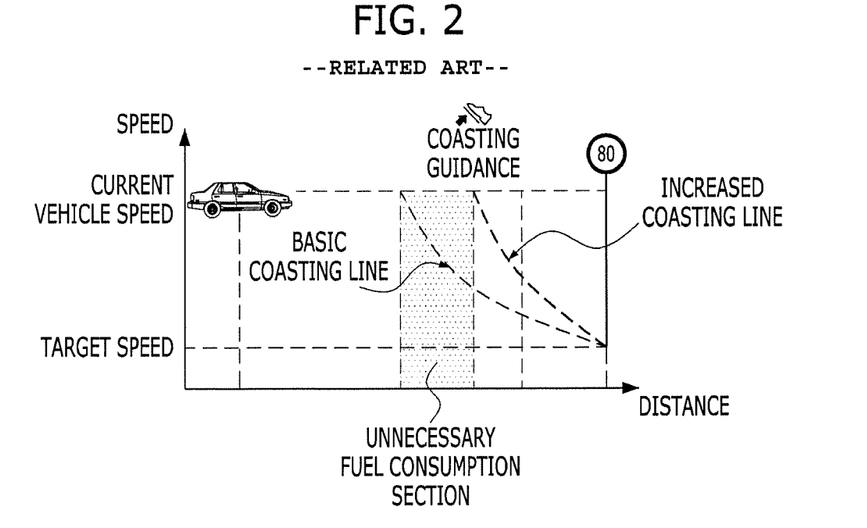
FIG. 2 is a view for explaining the concept of coasting guidance via general coasting-line adjustment.

FIG. 2 is a view for explaining the concept of coasting guidance via general coasting-line adjustment.

Referring to FIG. 2, the line, which represents variation in vehicle speed relative to distance when a coasting torque, which is applied to general coasting, is applied, may be referred to as a "basic coasting line", and the line, which represents variation in vehicle speed relative to distance when a torque greater than a general coasting torque is applied, may be referred to as an "increased coasting line".

When the increased coasting line is applied to coasting time point guidance, the effect of increasing fuel efficiency suffers somewhat compared to FIG. 1, but a deceleration may be performed at a level that does not disturb the surrounding traffic flow, and thus the coasting distance is reduced to some extent. The increased coasting line is usually set based on the determination of an engineer.

However, even if both the basic coasting line and the increased coasting line are used as described above, since the required coasting distance is uniformly calculated depending on the current speed, the target speed, and the remaining distance, an accelerator pedal release time point may be guided without considering the type of deceleration event or the driver's tendency. In particular, problems based on the driver's tendency will be described below with reference to FIGS. 3 and 4.

Figure 3:
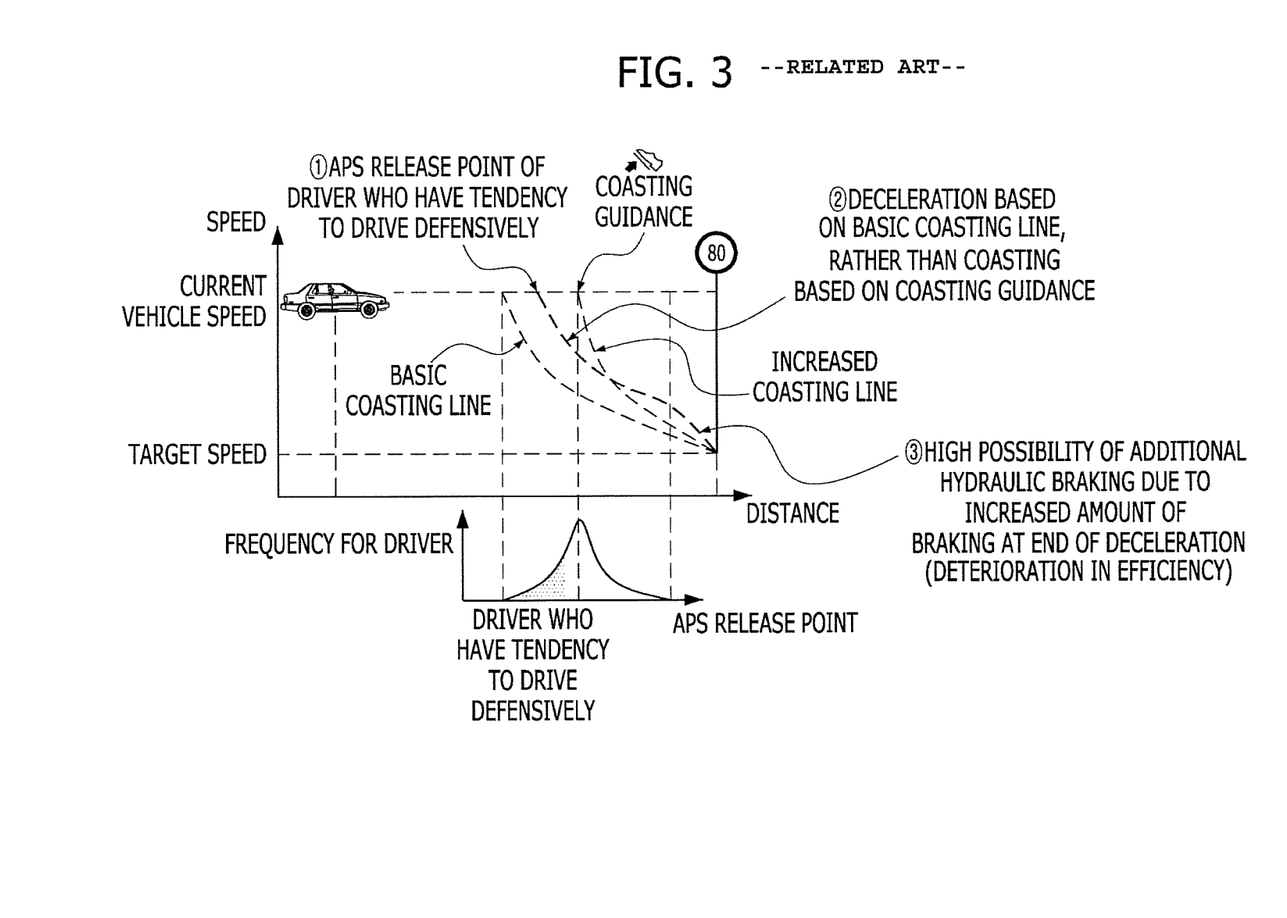
FIG. 3 is a view for explaining a problem when general coasting time point guidance is applied to drivers who have a tendency to drive defensively.

FIG. 3 is a view for explaining a problem when general coasting time point guidance is applied to drivers who have a tendency to drive slowly or defensively.

Referring to FIG. 3, when general coasting time point guidance is provided to drivers who have a tendency to drive more gently (slowly or defensively) than an average driver, such drivers are less likely to benefit from coasting guidance. That is, since drivers who have a tendency to drive defensively tend to release an accelerator pedal operation (APS off) in advance before the vehicle reaches a coasting guidance point, the vehicle may apply the basic coasting line, rather than the increased coasting line depending on a coasting guidance function. In this case, the driver cannot receive guidance about a coasting time point and the possibility of hydraulic braking is increased due to an increase in the amount of braking near a target point, which may deteriorate regenerative braking efficiency.

Figure 4:
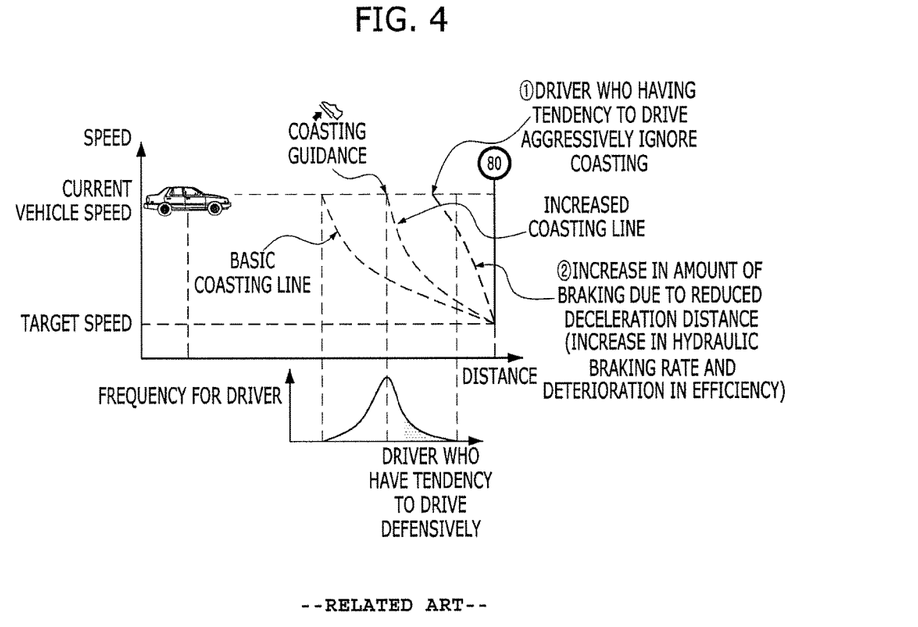
FIG. 4 is a view for explaining a problem when general coasting time point guidance is applied to drivers who have a tendency to drive aggressively.

FIG. 4 is a view for explaining a problem when general coasting time point guidance is applied to drivers who have a tendency to drive aggressively.

Referring to FIG. 4, when general coasting time point guidance is provided to drivers who have a tendency to drive more aggressively (offensively) than an average driver, such drivers feel that the guidance time point is early and still tend not to follow the coasting guidance. That is, since the drivers do not participate in coasting guidance because they feel that it is too different from their actual driving habits even at a guidance time point based on the increased coasting line, the effect of the coasting guidance function may not be seen at all.

SUMMARY

Accordingly, the present disclosure is directed to a vehicle and a method of providing information for the same that substantially obviate one or more problems due to limitations and disadvantages of the related art.

An object of the present disclosure is to provide a method of adjusting a coasting guidance time point more efficiently in a vehicle and a vehicle in which the same is implemented.

More particularly, an object of the present disclosure is to provide a method capable of performing coasting guidance optimized for respective driver tendencies and a vehicle in which the same is implemented.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of guiding a coasting time point of a vehicle includes steps of detecting, by a deceleration event detecting device of the vehicle, occurrence of an upcoming deceleration event, determining, by a guidance information controller of the vehicle, driver's coasting characteristics for each deceleration event based on information of the detected occurrence of an upcoming deceleration event and a vehicle driving state, and determining, by the guidance information controller, a coasting guidance time point based on a determined result of coasting characteristics corresponding to a type of the detected deceleration event.

In another aspect of the present disclosure, a vehicle includes a deceleration event detecting device configured to detect whether or not a deceleration event occurs, and a guidance information controller configured to determine driver's coasting characteristics for each deceleration event by acquiring information regarding the detected deceleration event from the deceleration event detecting device and information regarding a vehicle driving state and to determine a coasting guidance time point based on a determined result of coasting characteristics corresponding to a type of the detected current deceleration event.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Reference will now be made in detail to the preferred embodiments of the present disclosure, examples of which are illustrated in the accompanying drawings. However, it will be understood that the present disclosure should not be limited to the embodiments and may be modified in various ways. In the drawings, to clearly and briefly explain the present disclosure, illustration of elements having no connection with the description is omitted, and the same or extremely similar elements are designated by the same reference numerals throughout the specification.

In the entire specification, when an element is referred to as "including" another element, the element should not be understood as excluding other elements so long as there is no special conflicting description, and the element may include at least one other element. Wherever possible, the same reference numbers will be used throughout the drawings to refer to the same or like parts In the provision of coasting guidance to a driver, when the guidance is provided under the condition in which a target speed is uniformly fixed, it is difficult to satisfy all of various driver's driving tendencies. Thus, an embodiment of the present disclosure proposes to learn driver's coasting characteristics and variably determine a guidance time point based thereon.

A coasting time point guidance process according to the present embodiment may be basically divided into three steps. A first step is a step of learning driver's coasting characteristics, a second step is a step of determining a coasting guidance time point based on the learning, and a third step is a step of implementing additional guidance time point correction depending on the participation rate of drivers in the current coasting guidance.

The concepts of the respective steps will be described below with reference to FIG. 5.

Figure 5:
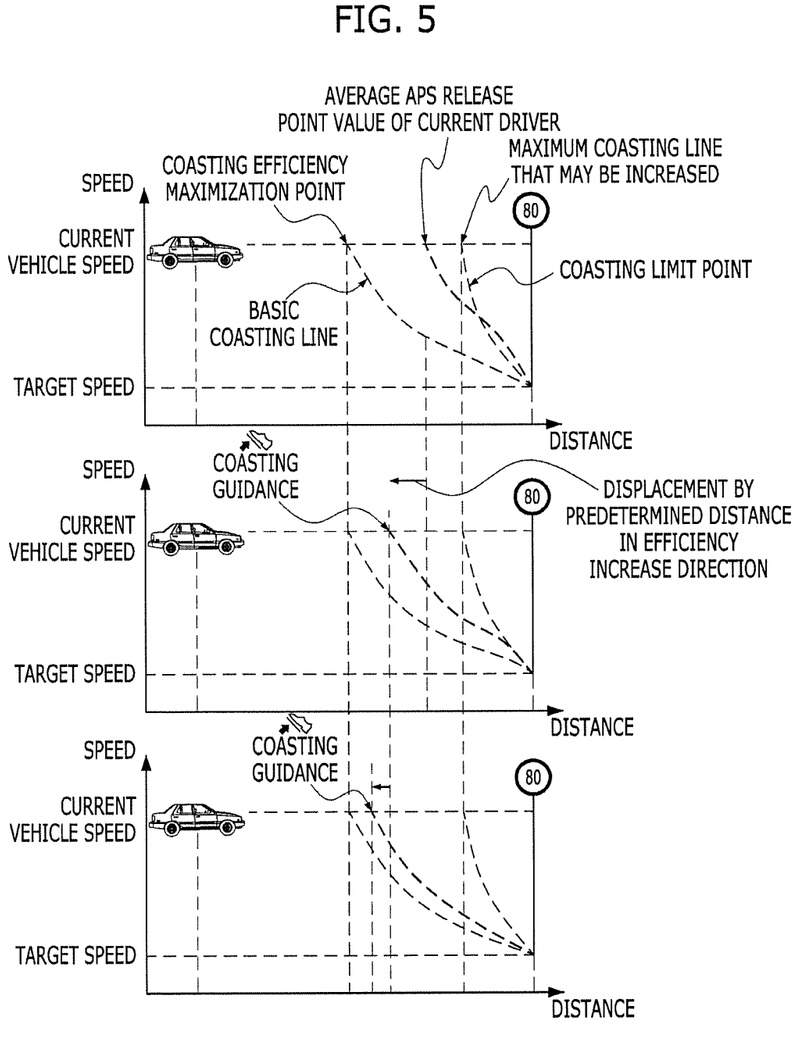
FIG. 5 is a view for schematically explaining a coasting time point guidance process according to an embodiment of the present disclosure.

FIG. 5 is a view for schematically explaining a coasting time point guidance process according to an embodiment of the present disclosure.

In FIG. 5, three graphs are illustrated, and the respective graphs correspond to the above-described three steps. In addition, in FIG. 5, the basic coasting line is set to maximize coasting efficiency, and a point, which is reversely operated by applying the basic coasting line to a target speed at an event point, is set to a coasting efficiency maximization point. In addition, a point, which is reversely operated by applying a maximum coasting line, which may be increased depending on vehicle characteristics, to the target speed at the event point, is set to a coasting limit point.

First, the learning step will be described with reference to the uppermost graph of FIG. 5.

The learning step may be performed to store information regarding the distance remaining to an event when the driver's APS is released for each deceleration event (e.g., tollgates, expressway ramps, and speed cameras), in order to learn driver's coasting characteristics. In addition, the present step may include a process of predicting and learning a release point of the current driver based on the average value of pieces of information regarding the accumulated and stored remaining distances. Through this process, as in the uppermost graph of FIG. 5, an average APS release point and a coasting line corresponding thereto may be set between the coasting efficiency maximization point and the coasting limit point.

Next, the guidance time point determination step will be described with reference to the middle graph of FIG. 5.

The determination step may be performed to output coasting guidance at a point that is displaced by a predetermined distance from the average APS release point of the driver in the direction in which coasting efficiency is increased. Of course, even when point displacement is performed, the final guidance point may be limited to the range between the coasting efficiency maximization point and the coasting limit point.

The additional guidance time point correction implementation step will be described with reference to the lowermost graph of FIG. 5.

The additional correction implementation step is a step of implementing guidance time point correction based on the participation rate of drivers in the guidance output in the determination step. For example, the higher the participation rate of drivers in the output guidance (the frequency at which the APS is released within a predetermined time range after the guidance is output), the guidance point may be displaced in the direction in which coasting efficiency is increased.

The learning step and the determination step, among the concept described above with reference to FIG. 5, and the guidance output process based thereon will be described below in more detail with reference to FIGS. 6 and 7.

Figure 6:
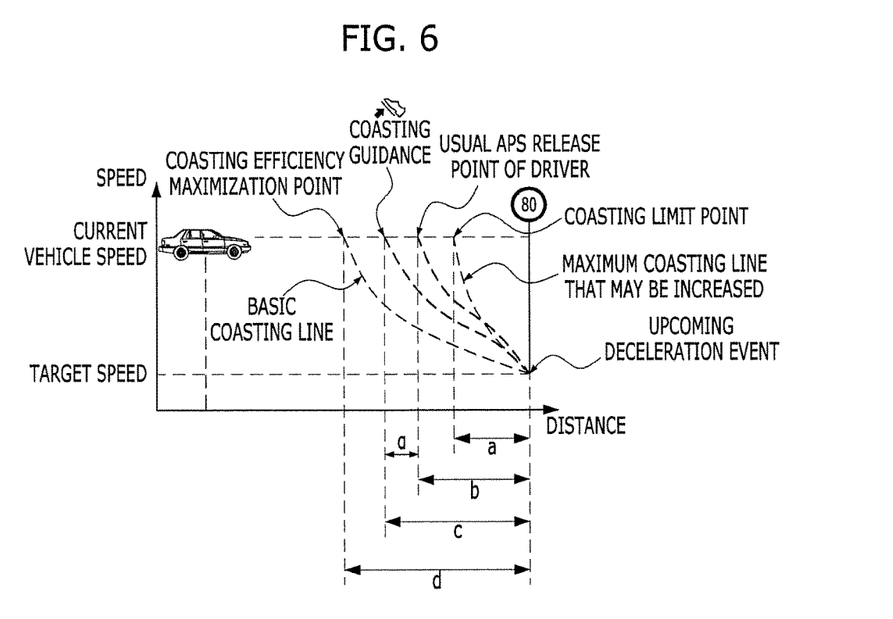
FIG. 6 is a view for explaining a coasting time point guidance process according to an embodiment of the present disclosure.
Figure 7:
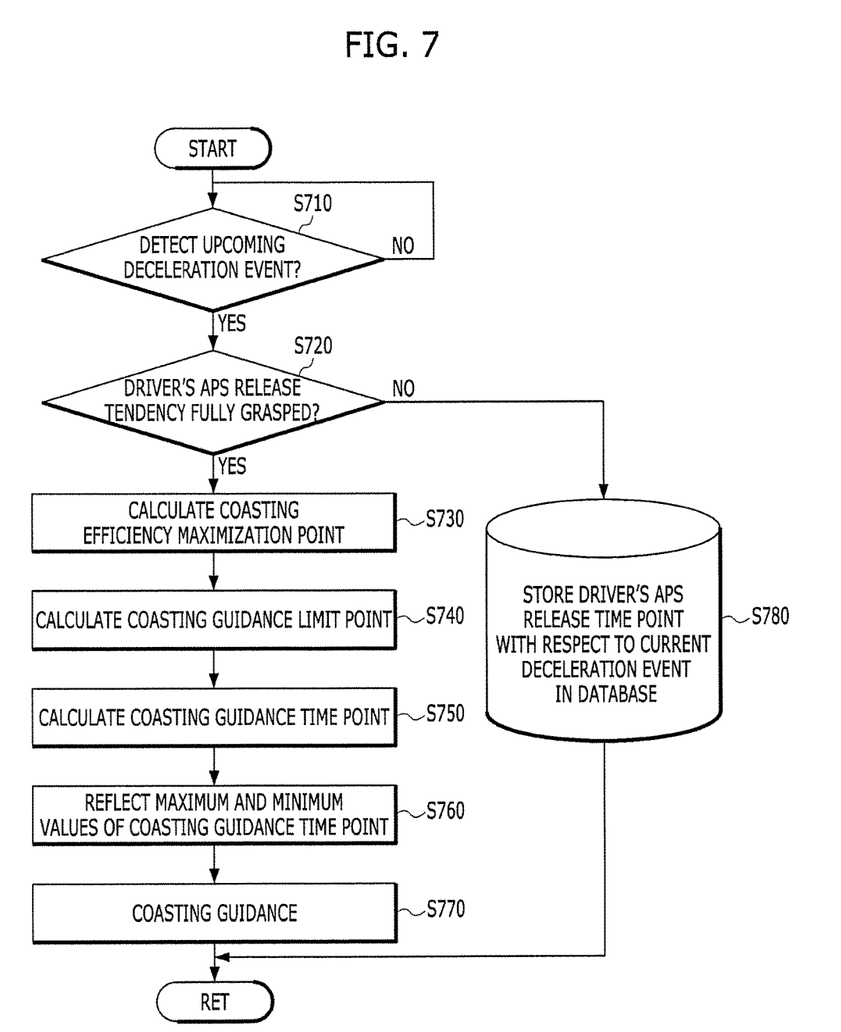
FIG. 7 is a flowchart illustrating an example of a coasting time point guidance process according to an embodiment of the present disclosure.

FIG. 6 is a view for explaining a coasting time point guidance process according to an embodiment of the present disclosure, and FIG. 7 is a flowchart illustrating an example of a coasting time point guidance process according to an embodiment of the present disclosure.

Referring to FIG. 7, first, whether or not an upcoming deceleration event exists may be determined (S710). When the upcoming deceleration event exists, whether or not the driver's APS release tendency is fully grasped may be determined (S720). Here, that the tendency is fully grasped may mean that information regarding the remaining distance to a current upcoming deceleration event when the driver's APS is released with respect to the corresponding event is collected and learned by preset number of times or more (i.e. that a satisfactory average and distribution have been determined).

When the driver's APS release tendency is not fully grasped, the driver's APS release time point with respect to the current upcoming deceleration event (or the remaining distance to the corresponding event when the APS is released) may be stored for learning (S780).

Conversely, when the driver's APS release tendency is fully grasped, a coasting efficiency maximization point ("d" in FIG. 6) and a coasting guidance limit point ("a" in FIG. 6) may be respectively calculated.

Here, the coasting efficiency maximization point d may be calculated based on at least one of a vehicle driving load, an upcoming slope, a current speed, or a basic coasting torque. In addition, the coasting guidance limit point a may be calculated based on at least one of a vehicle driving load, an upcoming slope, a current speed, or a maximum coasting torque. Here, the basic coasting torque and the limit coasting torque may mean torque upon the regenerative braking of an electric motor in a hybrid vehicle.

In addition, a coasting guidance time point ("c" in FIG. 6) may be calculated (S750).

The coasting guidance time point c may be calculated by adding a predetermined correction value ("a" in FIG. 6) to a driver's APS release time point ("b" in FIG. 6). At this time, the correction value may have a positive value when the coasting efficiency maximization point d is farther from an event point than the driver's APS release time point b, and otherwise, may have a negative value (If d>b then a>0, else a<0).

When the coasting guidance time point c is determined, a final coasting guidance time point c' may be determined by reflecting the maximum value and the minimum value of the guidance time point (S760). Here, the maximum value of the guidance time point corresponds to the previously acquired coasting efficiency maximization point d, and the minimum value of the guidance time point corresponds to the coasting guidance limit point a. Thus, the final coasting guidance time point c' cannot be smaller than the coasting guidance limit point a and cannot be greater than the coasting efficiency maximization point d. That is, the relation of c'=min(d, max(a, c)) may be determined.

When the final coasting guidance time point c' is determined, coasting guidance information may be output at the corresponding time point (S770).

Of course, although not illustrated, it will be appreciated as described above that, after step S770, the value of "a" with respect to the corresponding event may be additionally adjusted depending on whether or not the APS off is performed within a predetermined time/distance range from the time point at which the coasting guidance information is output.

Next, a vehicle structure in which the above-described method may be performed will be described with reference to FIG. 8.

Figure 8:
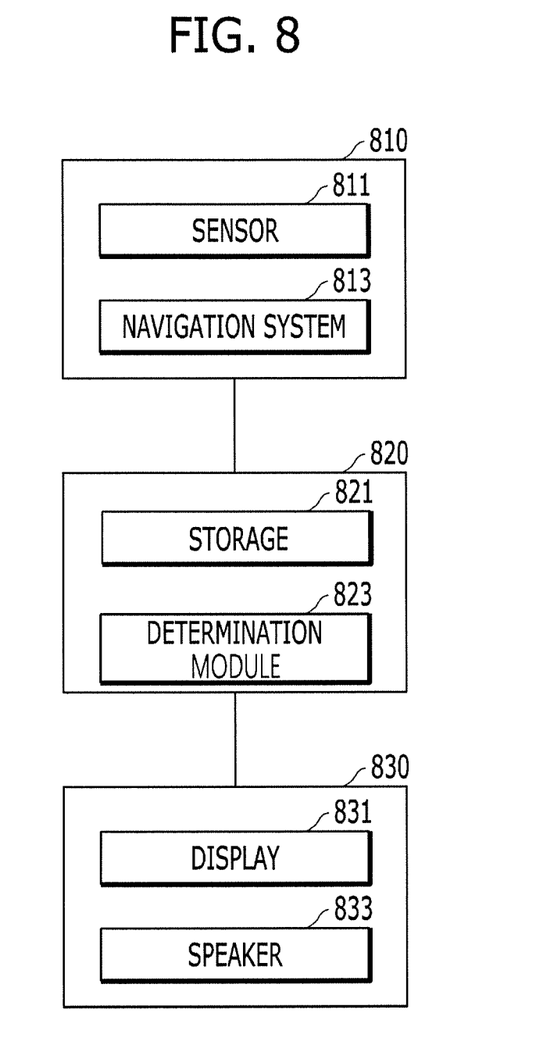
FIG. 8 is a block diagram illustrating an example of a vehicle structure according to another embodiment of the present disclosure.

FIG. 8 is a block diagram illustrating an example of the vehicle structure according to another embodiment of the present disclosure. Constituent elements illustrated in FIG. 8 are only some of the constituent elements required to perform the present embodiment, and it is to be noted that a greater number of constituent elements may be included.

Referring to FIG. 8, a vehicle according to the present embodiment may include a deceleration event detecting device 810, a guidance information controller 820, and an output device 830. Hereinafter, the respective units will be described in detail.

The deceleration event detecting device 810 serves to detect whether or not an upcoming deceleration event occurs and transmits information regarding the detected upcoming deceleration event. The deceleration event detecting device 810 may include at least one sensor 811 and a navigation system 813. The at least one sensor 811 may serve to detect whether or not an upcoming deceleration event occurs and the driving state of the vehicle, and may include, for example, a radar, a distance sensor, a vehicle-speed sensor, a camera, an APS, or a BPS, but this is given merely by way of example, and any other type of sensor may be applied so long as it can detect whether or not an upcoming deceleration event occurs and variation in the driving state of the vehicle. Here, the driving state of the vehicle may include information regarding an APS release time point with respect to at least one upcoming deceleration event, and may additionally include information regarding at least one of a driving load, an upcoming slope, and a current speed for the calculation of the coasting efficiency maximization point d and the coasting guidance limit point a.

In addition, the navigation system 813 may determine whether or not an upcoming deceleration event exists based on, for example, the shape/type of roads or the surroundings thereof present ahead in a current driving direction acquired using map information (e.g. a precise digital map), facilities on or around roads (e.g. a ramp, a sharp curve, or a school/playground zone), and variation in driving direction on the route while route guidance is being performed (e.g. left turn, right turn, and U-turn). In addition, the navigation system may calculate information regarding the remaining distance to the event when the APS is released.

As described above, the information detected by the deceleration event detecting device 810 is transmitted to the guidance information controller 820.

The guidance information controller 820 is an electric circuitry that executes instructions of software which thereby performs various functions described hereinafter.

The guidance information controller 820 may include a storage 821, which accumulates and stores information regarding a driver's APS release time point for each event and the remaining distance to the corresponding event when the APS is released from the deceleration event detecting device 810, and a determination module 823, which determines a final coasting guidance time point by performing steps S720 to S760 of FIG. 7 using the information stored in the storage 821 and received information when receiving upcoming deceleration event information from the deceleration event detecting device 810.

The guidance information controller 820 may request the output device 830 for guidance information output or may control the output device 830 so as to output guidance information via the output device 830 at the determined final coasting guidance time point.

The output device 830 may include at least one of a display 831 for visual guidance output or a speaker 833 for auditory guidance output. Here, the display 831 may include at least one of at least one area of a cluster, a head-up display (HUD), or a display of an AVN system, but this is given merely by way of example, and any type of vehicle display may be applied so long as it can visually guide a coasting time point.

In the vehicle structure described above, two or more constituent elements written as different elements may be realized as one device in an actual vehicle, and a single constituent element may be realized as two or more devices having distributed functions thereof in an actual vehicle.

For example, all of the deceleration event detecting device 810, the guidance information controller 820, and the output device 830 may be realized to perform the respective functions together via an AVN system. In another example, the guidance information controller 820 and the output device 830 may be realized so as to be included in a cluster.

When coasting time point guidance according to the embodiment of the present disclosure described above is performed, the following effects may be anticipated.

First, the participation rate in coasting may be increased by indicating the point at which coasting begins so as to gradually increase coasting efficiency based on current driver habits. In addition, all drivers ranging from those who have a tendency to drive defensively to those who have a tendency to drive aggressively may anticipate an effect of increasing fuel efficiency compared to conventional driving, and thus an effect of reducing exhaust gas emissions may be anticipated. In addition, since a smart brand image may be provided compared to an existing function in consideration of driver habits, the merchantability of the vehicle may be improved.

The disclosure described above may be implemented as computer readable code in a medium in which a program is recorded. Computer readable recording media include all kinds of recording devices in which data readable by computer systems is stored. The computer readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a vehicle associated with at least one embodiment of the present disclosure having the above-described configuration is capable of providing a driver with coasting guidance at a more efficient time point.

Particularly, since the vehicle according to the present disclosure learns driver's coasting characteristics and variably determines a guidance time point based thereon, a coasting guidance time point, which is optimized for each upcoming deceleration event and for the characteristics of individual drivers, may be determined, which enables the provision of coasting guidance at a passage speed of a deceleration point desired by the driver.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method of guiding a coasting time point of a vehicle, the method comprising steps of:
    detecting, by a deceleration event detecting device of the vehicle, occurrence of an upcoming deceleration event;
    determining, by a guidance information controller of the vehicle, driver's coasting characteristics for each deceleration event based on information of at least one previous deceleration event and a vehicle driving state; and
    determining, by the guidance information controller, a coasting guidance time point based on a determined result of coasting characteristics corresponding to a type of the detected deceleration event.

2. The method according to claim 1, wherein the step of determining driver's coasting characteristics is performed using information regarding a distance to a corresponding deceleration event when a driver releases an accelerator pedal operation for each deceleration event.

3. The method according to claim 2, wherein the step of determining a coasting guidance time point comprises determining a first point, which is a point at which the driver releases the accelerator pedal operation on average.

4. The method according to claim 3, wherein the step of determining a coasting guidance time point comprises determining a second point by adding a correction value to the first point.

5. The method according to claim 4, wherein the step of determining a coasting guidance time point further comprises calculating a third point, which is a coasting efficiency maximization point, and a fourth point, which is a coasting limit point.

6. The method according to claim 5, wherein the correction value has a positive value when the third point is farther than the first point from the detected deceleration event and has a negative value when the third point is closer than the first point to the detected deceleration event.

7. The method according to claim 5, wherein the third point is determined based on a current driving situation and a basic coasting torque of an electric motor, and
wherein the fourth point is determined based on the current driving situation and a maximum coasting torque of the electric motor.

8. The method according to claim 5, wherein the step of determining a coasting guidance time point further comprises determining, as a final coasting guidance point, a point that is closer to the detected deceleration event among the third point and one of the fourth point and the second point that is farther from the detected deceleration event.

9. The method according to claim 8, further comprising:
outputting, by an output device of the vehicle, a predetermined type of guidance information at a time point at which the final coasting guidance point has been reached; and
adjusting, by the guidance information controller, the correction value based on a frequency at which the driver releases the accelerator pedal operation within a predetermined time after the guidance information is output.

10. A computer-readable recording medium in which a program for executing the method of guiding a coasting time point according to claim 1 is recorded.

11. A vehicle comprising:
a deceleration event detecting device configured to detect whether or not a deceleration event occurs; and
a guidance information controller configured to determine driver's coasting characteristics for each deceleration event by acquiring information of at least one previous deceleration event from the deceleration event detecting device and information regarding a vehicle driving state and to determine a coasting guidance time point based on a determined result of coasting characteristics corresponding to a type of the detected current deceleration event.

12. The vehicle according to claim 11, wherein the guidance information controller determines the coasting characteristics using information regarding a distance to a corresponding deceleration event when a driver releases an accelerator pedal operation for each deceleration event.

13. The vehicle according to claim 12, wherein the guidance information controller determines a first point, which is a point at which the driver releases the accelerator pedal operation on average.

14. The vehicle according to claim 13, wherein the guidance information controller determines a second point by adding a correction value to the first point.

15. The vehicle according to claim 14, wherein the guidance information controller calculates a third point, which is a coasting efficiency maximization point, and a fourth point, which is a coasting limit point.

16. The vehicle according to claim 15, wherein the correction value has a positive value when the third point is farther than the first point from the detected deceleration event and has a negative value when the third point is closer than the first point to the detected deceleration event.

17. The vehicle according to claim 15, wherein the third point is determined based on a current driving situation and a basic coasting torque of an electric motor, and
wherein the fourth point is determined based on the current driving situation and a maximum coasting torque of the electric motor.

18. The vehicle according to claim 15, wherein the guidance information controller determines, as a final coasting guidance point, a point that is closer to the detected deceleration event among the third point and one of the fourth point and the second point that is farther from the detected deceleration event.

19. The vehicle according to claim 18, further comprising an output device configured to output a predetermined type of guidance information at a time point at which the final coasting guidance point has been reached,
wherein the guidance information controller adjusts the correction value based on a frequency at which the driver releases the accelerator pedal operation within a predetermined time after the guidance information is output.

* * * * *